United States Patent [19]

Horinouchi et al.

[11] Patent Number: 4,977,114

[45] Date of Patent: Dec. 11, 1990

[54] ZIRCONIA CERAMICS AND METHOD FOR PRODUCING SAME

[75] Inventors: Kazuo Horinouchi; Katsuya Maeda, both of Niihama, Japan

[73] Assignee: Sumitomo Chemical Company, Limited, Osaka, Japan

[21] Appl. No.: 438,946

[22] Filed: Nov. 17, 1989

Related U.S. Application Data

[63] Continuation-in-part of Ser. No. 228,113, Aug. 4, 1988, abandoned, which is a continuation-in-part of Ser. No. 125,683, Nov. 25, 1987, abandoned.

[30] Foreign Application Priority Data

Nov. 28, 1986 [JP] Japan .................. 61-285599

[51] Int. Cl.$^5$ ............................................. C04B 35/48
[52] U.S. Cl. .................... 501/104; 501/103; 264/66
[58] Field of Search .................... 501/103, 104; 264/66

[56] References Cited

U.S. PATENT DOCUMENTS

| | | | |
|---|---|---|---|
| 4,035,191 | 7/1977 | Johns | 501/104 |
| 4,525,464 | 6/1985 | Claussen et al. | 501/104 |
| 4,656,145 | 4/1987 | Soroi | 501/104 |
| 4,690,910 | 9/1987 | Tsukuma et al. | 501/103 |
| 4,719,091 | 1/1988 | Wusirika | 501/103 |

FOREIGN PATENT DOCUMENTS

3610528 12/1986 Fed. Rep. of Germany.

OTHER PUBLICATIONS

Proceedings—Australian Ceramic Conference (12th), V. Gross et al, Aug. 1986, pp. 371-378.

*Primary Examiner*—William R. Dixon, Jr.
*Assistant Examiner*—Deborah Jones
*Attorney, Agent, or Firm*—Stevens, Davis, Miller & Mosher

[57] ABSTRACT

Disclosed are zirconia ceramics superior in mechanical strength, hardness and toughness and a method for producing them. The zirconia ceramics contain ca. 7-12 mol % of cerium oxide and ca. 2-7 mol % of magnesium oxide and have an average crystal grain size of crystal grains thereof of 1 $\mu$m or less, at least ca. 80 mol % of the crystal grains being tetragonal grains and the balance being monoclinic grains, and have a bending strength of at least 100 kg/mm$^2$, a fracture toughness of at least 10 MNm$^{-1.5}$ and a Vickers hardness of at least 1000 kg/mm$^2$. The method comprises calcining a hydrate obtained by coprecipitation method from water-soluble salts of cerium and magnesium and a basic salt of zirconium or a hydrate obtained by adding water-soluble salts of cerium and magnesium to a zirconium hydrate and neutralizing the mixture of hydrates, further grinding the calcined hydrate to obtain zirconia powders of 1 $\mu$m or less in average crystal grain size, then shaping the powders and sintering the resulting shaped product.

2 Claims, No Drawings

ZIRCONIA CERAMICS AND METHOD FOR PRODUCING SAME

This application is a continuation-in-part of Ser. No. 228,113, filed Aug. 4, 1988, now abandoned, which in turn is a continuation-in-part of Ser. No. 125,683, filed Nov. 25, 1987, now abandoned.

BACKGROUND OF THE INVENTION

This invention relates to zirconia ceramics superior in mechanical strength, hardness and toughness and a method for producing same. More particularly, it relates to zirconia ceramics superior in mechanical strength, hardness and toughness which is especially suitable as mechanical structural materials and which contain cerium oxide (sometimes referred to as "$CeO_2$" hereinafter) and magnesium oxide (sometimes referred to as "MgO" hereinafter) as stabilizers and a method for producing same.

It has been well known to use $CeO_2$ or MgO as a stabilizer for zirconium oxide (sometimes referred to as "$Zr_{O2}$" hereinafter).

For example, when $CeO_2$ is contained in an amount of 20 mol% or more for $Zr_{O2}$, a zirconia ceramic comprising tetragonal phase and cubic phase can be obtained, when $CeO_2$ is contained in an amount of 16–20 mol%, a completely stabilized zirconia ceramic comprising tetragonal phase crystal can be obtained and when $CeO_2$ is less than 16 mol%, an unstabilized zirconia ceramic comprising only monoclinic phase at room temperature can be obtained. [cf. "Journal of Materials Science", 17 (1982), page 256, FIG. 1]. However, all of these products are not sufficient in mechanical strength and hardness, although high in toughness.

Furthermore, zirconia ceramics comprising $ZrO_2$ containing MgO are also known, but in this case, tetragonal phase precipitated at 1240°–1400° C. is decomposed into monoclinic phase and MgO while cooling.

Therefore, in the case of magnesia-partially stabilized zirconia ceramics, the mixture is first fired to obtain cubic phase solid solution and rapidly cooled at a suitable cooling rate to precipitate tetragonal phase in the cubic grain matrix. [cf. "Journal of American Ceramic Society", vol. 50, no. 6 (1967), pages 288–290].

However, in this case, grain size of cubic phase of the ceramic obtained is large, namely, about 10–100 μm and zirconia ceramics superior in mechanical strength cannot be obtained.

Furthermore, zirconia ceramics prepared using $CeO_2$ and MgO in combination as a stabilizer is reported in "AUSTCERAM", 86, Aug. 1986, PROCEEDINGS pages 371–378. That is, this literature discloses spongy sintered products having a strength of 700 Mpa in maximum and a toughness of 8 $MNm^{-1.5}$ (MeGa Newton/meter 15 ) and a density of 95% or less with crystal grain size of 1 μm or less.

This method is advantageous in that $CeO_2$ and MgO which are stabilizers are less expensive than $Y_2O_3$, but the ceramics obtained by the method cannot be said to be sintered products having well balanced and excellent characteristics such as strength, toughness and hardness which are required as mechanical structural materials.

Under these circumstances, the inventors have made intensive researches in an attempt to obtain zirconia ceramics superior in mechanical strength, hardness and toughness using $CeO_2$ and MgO which are less expensive than $Y_2O_3$ and found that a sintered product which satisfies the above required properties can be obtained when $CeO_2$ and MgO are used in combination at a specific ratio and when raw material powders are prepared by a specific method and they are shaped and sintered. This invention is based on this finding.

SUMMARY OF THE INVENTION

That is, this invention provides (1) zirconia ceramics, characterized in that the ceramics contain 7–12 mol% of cerium oxide and 2–7 mol% of magnesium oxide and that average crystal grain size of crystal grains constituting the ceramics is 1 μm or less, at least 80 mol% of the crystal grains are tetragonal grains and the balance are monoclinic grains and the ceramics have a bending strength of at least 100 kg/mm$^2$, a fracture toughness of at least 10 $MNm^{-1.5}$ and a Vickers hardness of at least 1000 kg/mm$^2$ and (2) a method for producing zirconia ceramics containing 7–12 mol% of cerium oxide and 2–7 mol% of magnesium oxide, having an average crystal grain size of 1 μm or less, at least 80 mol% of the crystal grains being tetragonal grains and the balance being monoclinic grains and having a bending strength of at least 100 kg/mm$^2$, a fracture toughness of at least 10 $MNm^{-1.5}$ and a Vickers hardness of at least 1000 kg/mm$^2$ which comprises calcining a hydrate obtained by coprecipitation method from water-soluble salts of cerium and magnesium and a basic salt of zirconium which are prepared so as to give desired compositions after sintering or a hydrate obtained by adding water-soluble salts of cerium and magnesium to a Zirconium hydrate which are also prepared so as to give desired compositions after sintering and neutralizing the mixture, further grinding the calcined hydrate to obtain zirconia powders of 1 μm or less in average crystal grain size, then shaping the powders and sintering the resulting shaped product.

DESCRIPTION OF THE INVENTION

This invention will be explained in more detail.

The zirconia ceramics of this invention comprises about 4 to 7 about 12 mol%, preferably about 8–about 10 mol% of $CeO_2$, about 2–about 7 mol%, preferably about 3–about 6 mol% of MgO and the balance being $Zr_{O2}$ and at least about 80 mol%, normally at least about 90% by weight of crystal grains constituting the zirconia ceramics at room temperature are tetragonal grains and the balance are monoclinic grains and average crystal grain size is about 1 μm or less.

Usually, when amount of stabilizer in ceramics is respectively less than 16 mol% for $CeO_2$ and less than 8 mol% for MgO, tetragonal phase is not stabilized while in the ceramics of this invention the tetragonal phase is metastably present at room temperature although the mechanism of such effect is unknown.

However, when content of $CeO_2$ is outside the above range, the effect of stabilization of tetragonal phase is small and ceramics of sufficiently high mechanical strength cannot be obtained.

On the other hand, when content of MgO is less than 2 mol%, fine grained ceramics cannot be easily obtained and when more than 7 mol%, ratio of tetragonal phase is reduced and zirconia ceramics of desired properties cannot be obtained.

In this invention, the zirconia ceramics contain the above mentioned stabilizers and besides the crystal structure is mainly composed of tegragonal phase at room temperature and average crystal grain size is about 1 μm or less.

When the average crystal grain size is more than about 1 μm, ratio of monoclinic crystal increases in the ceramics resulting in reduction of mechanical strength.

For production of such zirconia ceramics, particle size and particle size distribution of raw materials and sintering conditions may be adjusted so that relative density of $CeO_2$-MgO-TSZ (tetragonal crystal stabilized zirconia) sintered product to theoretical density thereof is at least 90% (i.e., porosity: at most 10%), preferably at least about 95%.

The specific production conditions depend on method for obtaining the raw materials, calcination conditions, grinding conditions, crushing conditions and mixing conditions of $CeO_2$ and MgO and cannot be simply determined, but most simply, raw zirconia powder of about 1 μm or less, preferably about 0.5 μm or less in average particle size may be used for easy sintering at low temperatures.

More specifically, a hydrate obtained from water-soluble salts of cerium and magnesium and a basic salt of zirconium by coprecipitation method or a hydrate obtained by adding water-soluble salts of cerium and magnesium to a zirconia hydrate and neutralizing the mixture is dried, then the hydrate is calcined at $650 \pm 100°$ C. for 1-5 hours to make powders of about 1 $m^2/g$ or more, preferably about 10 $m^2/g$-about 50 $m^2/g$ in BET specific surface area and the powders are further ground by a vibration mill, a jet mill, etc. to obtain zirconia powders of about 1 μm or less in average particle size.

Then, this powder is shaped by known shaping methods such as metal die pressing or cold isostatic pressing, extrusion molding, injection molding and the like or by combination of some of them and then this shaped product is heated to 1350°-1750° C. in a heating furnace and thereafter sintered for several hours, for example, 1-5 hours. Thus, the zirconia ceramics of this invention are obtained. The sintering atmosphere may be optionally chosen depending on purpose, for example, in the air, in non-oxidizing atmosphere such as in vacuum, nitrogen, argon or the like or first in the air and then in non-oxidizing atmosphere.

Thus obtained zirconia ceramics of this invention generally have a sintered density of more than 95% of theoretical density and are markedly excellent in mechanical properties and generally gives a bending strength of at least 100 $kg/mm^2$, a fracture toughness of at least 10 $MNm^{-1.5}$ and a Vickers hardness of at least 1000 $kg/mm^2$.

Furthermore, zirconia ceramics of tetragonal crystal structure which contain 3 mol% of yttrium oxide as a stabilizer have the critical defect that they normally show spontaneous transition from tetragonal to monoclinic phase in the air of 100°-300° C. resulting in reduction of thermal stability in mechanical strength while the zirconia ceramics of this invention show no such transformation of from tetragonal crystal to monoclinic phase even when they are left to stand for 1000 hours at 100°-300° C. and thus are excellent in thermal stability.

It is not clear why the zirconia ceramics of this invention are superior in mechanical strength. However, it can be suggested that according to X-ray diffractometry, the zirconia ceramics of this invention show the similar tetragonal diffraction pattern to that of the tetragonal phase of zirconia ceramics containing more than 16 mol% of $CeO_2$ which is stable at room temperature, but being different from said stable tetragonal phase, the tetragonal phase of the zirconia ceramics of this invention is so-called metastable tetragonal phase which is partially transformed to monoclinic crystal (called martensitic transformation) by external force such as mechanical loading or thermal stress and hence even if cracks occur by mechanical stress, transformation of from tetragonal to monoclinic simultaneously occurs and the resulting volume expansion causes absorption of fracture energy to prevent propagation of cracks.

As explained in detail hereabove, this invention provides zirconia ceramics which contain, as stabilizers, $CeO_2$ and MgO less expensive than $Y_2O_3$ in combination at a specific ratio and which are equal or superior to $Y_2O_3$-containing zirconia ceramics in bending strength and hardness and markedly superior in fracture toughness and further which are remarkably improved in bending strength and hardness without deterioration of toughness as compared with those containing $CeO_2$ or MgO individually and not in combination. The zirconia ceramics of this invention are very useful as mechanical structural materials such as cutting tools, extrusion and drawing dies, engine parts, bearing balls, balls for ball point pens, mechanical seal, shafts, nozzles, pistons, etc., solid electrolyte materials such as oxygen sensors. Thus, industrial value thereof is tremendously high.

In the explanation on production of the zirconia ceramics of this invention, only zirconia powder and stabilizers are referred to as raw materials, but these are principal components and, of course, it is possible to use sintering promotors and grain growth inhibitors known in this field such as silica, alumina, titania, kaolin, mullite, etc. as far as they do not damage the effects of this invention.

Example 1

Hydrate obtained by precipitation of $ZrOCl_2 \cdot 8H_2O$ with ammonia water was filtrated. To this precipitated hydrate of zirconia were added cerium nitrate and magnesium chloride as aqueous solutions so as to gain the composition of $Ce_{02}$-MgO-$ZrO_2$ after sintering as shown in Experiment Nos. 1 and 2 of Table 1, followed by wet mixing : mill, neutralizing, filtrating, drying and crushing into powders. Thus obtained powders were calcined at 600° C. for 2 hours and further milled in vibration mill to obtain ceria-and magnesia-containing zirconia powders 20 $m^2/g$ in BET surface area and 0.1 μm in average particle size.

The powders were compacted into $35 \times 5 \times 5$ mm by a cold isostatic press ($1T/cm^2$) and sintered at 1500° C. for 2 hours in an electric furnace.

Properties of obtained zirconia ceramics produced by this process are shown in Table 1 as experiments 1, 2 and 5.

Proportions of $CeO_2$ and/or MgO were changed so as to be outside the claimed range. The results thereof are shown in Table 1 as Experiment Nos. 3-11.

Comparative Example 1

Zirconia ceramics were produced in the same manner as in Example 1 except that zirconia powders comprising 97 mol% of $ZrO_2$ and 3 mol% of $Y_2O_3$ were used as raw material in place of the compositions of $CeO_2$—MgO—$ZrO_2$.

The obtained zirconia ceramics had a bending strength of 120 $kg/mm^2$, a fracture toughness of 6 $MnM^{-1.5}$ and a hardness of 1250 $kg/mm^2$. Average crystal grain size was 0.5 μm and crystal structure comprised tetragonal phase 95 mol% and monoclinic phase 5 mol%.

Comparative Example 2

86 mol% of zirconia powder (average particle size 0.5 μm), 10 mol% of cerium dioxide powder (average particle size 1 μm) and 4 mol% of magnesium oxide (average particle size 0.1 μm) was wet produced by mixing the components in a ball mill at a slurry concentration of 50% by weight using a water solvent for 24 hours. This slurry was filtered by a filter press, dried at 150° C., fired at 800° C. for 2 hours, cooled and then ground by a vibration mill. The resulting zirconia powders containing ceria and magnesia had an average particle size of 0.5 μm and a BET specific surface area of 15 m²/g.

The resulting powders were compacted into 35×5×5 mm by a cold isostatic press (1 T/cm²) and sintered at 1500° C. for 2 hours in an electric furnace.

The thus obtained zirconia ceramics had a bending strength of 70 kg/mm², a fracture toughness of 6 MNm$^{-1.5}$ and a hardness of 1000 kg/mm² and an average crystal grain size of 2 μm (mixture of grains of about 0.5 μm and about 5 μm) and had a crystal structure comprising 70 mol% of tetragonal grains and 30 mol% of monoclinic grains.

In the above examples and comparative examples, sintered density was measured by Archimedean method, crystal structure by X-ray diffractometry, fracture toughness and hardness by V.I. (Vickers Indentation) method proposed by Evans et al (measuring conditions: load; 30 kg × 15 sec and Young's modulus E=1.86×10$^{15}$MN/m²) and bending strength by three-point bending test (span length: 30 mm and load application rate: 0.5 mm/ min).

For crystal structure, tetragonal phase in which cubic phase is partially included is also taken as tetragonal phase here.

Grain size of sintered product was measured by the line intersection method using the photomicrographs taken from electron microscope.

TABLE 1

| Experiment No. | Composition of raw material (mol %) | | | Bending strength $\sigma b$ (kg/mm²) | Fracture toughness $K_1C$ (MN/m$^{3/2}$) | Hardness Hv (kg/mm²) | Average crystal grain size (μm) | Crystal structure of sintered Product (mol %) | Note |
|---|---|---|---|---|---|---|---|---|---|
| | ZrO$_2$ | CeO$_2$ | MgO | | | | | | |
| 1 | 86 | 10 | 4 | 130 | 17 | 1100 | 0.6 | Tetragonal 100 | No transformation of from tetragonal to monoclinic was seen even when left to stand at 100–300 C. for 1000 hours in the air. |
| 2 | 84 | 10 | 6 | 130 | 16 | 1100 | 0.6 | Tetragonal 100 | |
| 3 | 82 | 14 | 4 | 40 | 16 | 900 | 2.0 | Tetragonal 100 | |
| Comparative Experiment 4 | 90 | 6 | 4 | 110 | 9 | 1200 | 0.5 | Tetragonal 100 | |
| 5 | 88 | 6 | 6 | 110 | 8 | 1200 | 0.5 | Tetragonal 100 | |
| 6 | 90 | 4 | 6 | 110 | 8 | 1200 | 0.6 | Tetragonal 80 Monoclinic 20 | |
| 7 | 91 | 2 | 7 | 60 | 5 | 1200 | 0.5 | Tetragonal 60 Monoclinic 40 | |
| 8 | 90 | 10 | — | 60 | 18 | 800 | 1.5 | Tetragonal 100 | |
| 9 | 86 | 14 | — | 40 | 20 | 850 | 1.5 | Tetragonal 100 | |
| 10 | 92 | — | 8 | 40 | 8 | 950 | 30 | Cubic 50 Tetragonal 30 Monoclinic 20 | |
| 11 | 95 | — | 5 | 20 | 5 | 1000 | 10 | Cubic 20 Monoclinic 80 | |

What is claimed is:

1. Zirconia ceramics which contain 7–12 mol% of cerium oxide and 2–7 mol% of magnesium oxide and which have an average crystal grain size of 1 μm or less, at least 80 mol% of the crystal grains being tetragonal grains and the balance being monoclinic grains, and have a bending strength of at least 100 kg/mm², a fracture toughness of at least 10 Mnm$^{-1.5}$ and a Vickers hardness of at least 1000 kg/mm².

2. A method for producing zirconia ceramics consisting essentially of about 7–12 mol% of cerium oxide and about 2–7 mol% of magnesium oxide, having an average crystal grain size of 1 μm or less, at least about 80 mol% of the crystal grains being tetragonal grains and the balance being monoclinic grains and having a bending strength of at least 100 kg/mm², a fracture toughness of at least 10 Mnm$^{-1.5}$ and a Vickers hardness of at least 1000 kg/mm² which comprises calcining a hydrate obtained by coprecipitation from water-soluble salts of cerium and magnesium and a basic salt of zirconium which are prepared so as to give the above-mentioned compositions after sintering or a hydrate obtained by adding water-soluble salts of cerium and magnesium to a zirconium hydrate which are also prepared so as to give the above-mentioned compositions after sintering and neutralizing the mixture of hydrates, further grinding the calcined hydrate to obtain zirconia powders of 1 μm or less in average crystal grain size, then shaping the powders and sintering the resulting shaped product.

* * * * *